(12) United States Patent
Agata et al.

(10) Patent No.: US 8,416,559 B2
(45) Date of Patent: Apr. 9, 2013

(54) KEYBOARD FOR SLATE PERSONAL COMPUTERS

(75) Inventors: Hiroaki Agata, Kanagawa-Ken (JP); Fumio Tamura, Kanagawa-Ken (JP)

(73) Assignee: Lenovo PTE. Ltd, Singapore (SG)

( * ) Notice: Subject to any disclaimer, the term of this patent is extended or adjusted under 35 U.S.C. 154(b) by 264 days.

(21) Appl. No.: 12/939,768

(22) Filed: Nov. 4, 2010

(65) Prior Publication Data
US 2012/0113579 A1  May 10, 2012

(51) Int. Cl.
*G06F 1/16* (2006.01)

(52) U.S. Cl.
USPC ............ 361/679.09; 361/679.02; 361/679.57; 345/168

(58) Field of Classification Search . 361/679.11–679.13
See application file for complete search history.

(56) References Cited

U.S. PATENT DOCUMENTS

| | | | |
|---|---|---|---|
| 5,192,150 A * | 3/1993 | Ruggeberg | 400/477 |
| 5,375,076 A * | 12/1994 | Goodrich et al. | 361/679.17 |
| 6,430,038 B1 * | 8/2002 | Helot et al. | 361/679.05 |
| 6,700,774 B2 * | 3/2004 | Chien et al. | 361/679.2 |
| 6,768,635 B2 * | 7/2004 | Lai et al. | 361/679.11 |
| 7,030,859 B2 * | 4/2006 | Lin et al. | 345/168 |
| 8,231,099 B2 * | 7/2012 | Chen | 248/688 |
| 2004/0056843 A1 * | 3/2004 | Lin et al. | 345/168 |
| 2005/0052831 A1 * | 3/2005 | Chen | 361/680 |
| 2007/0223184 A1 * | 9/2007 | Garrett | 361/681 |
| 2008/0310088 A1 * | 12/2008 | Chen | 361/680 |

FOREIGN PATENT DOCUMENTS

JP  2002-73252 A  3/2002

OTHER PUBLICATIONS http://shop.lenovo.com/SEUILibrary/controller/e/web/LenovoPortal/en_US/catalog.workflow:category.details?current-catalog-id=12F0696583E04D86B9B79B0FEC01C087&current-category-id=329576204C9E42289967E79E0E7C9A2D&tabname=Gallery.

* cited by examiner

*Primary Examiner* — Anthony Q Edwards
(74) *Attorney, Agent, or Firm* — Shimokaji & Assoc., PC

(57) ABSTRACT

A computer system may comprise an upper housing, a processor, a display screen, a keyboard case, and a lower housing. The display screen may be attached to the upper housing. The processor may be disposed within the upper housing. The lower housing may comprise a keyboard and may be mounted to and pivotable with respect to the upper housing. The keyboard cover may be adapted to cover the keyboard.

18 Claims, 3 Drawing Sheets

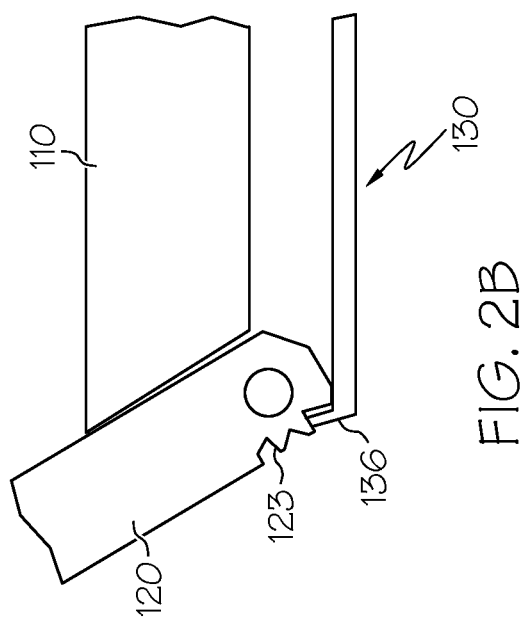
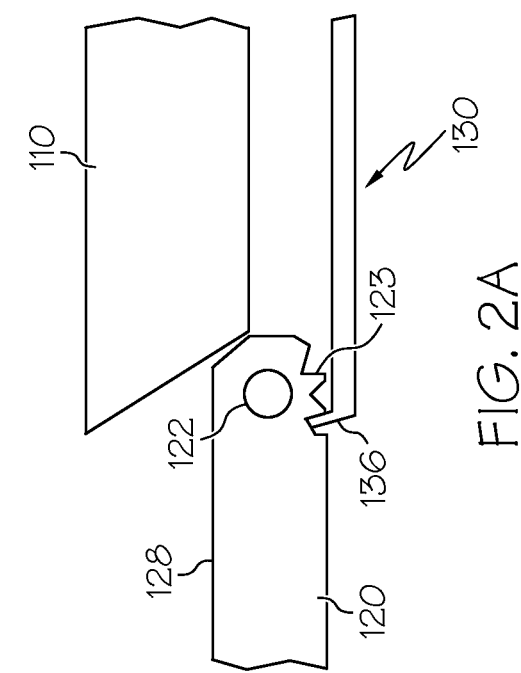

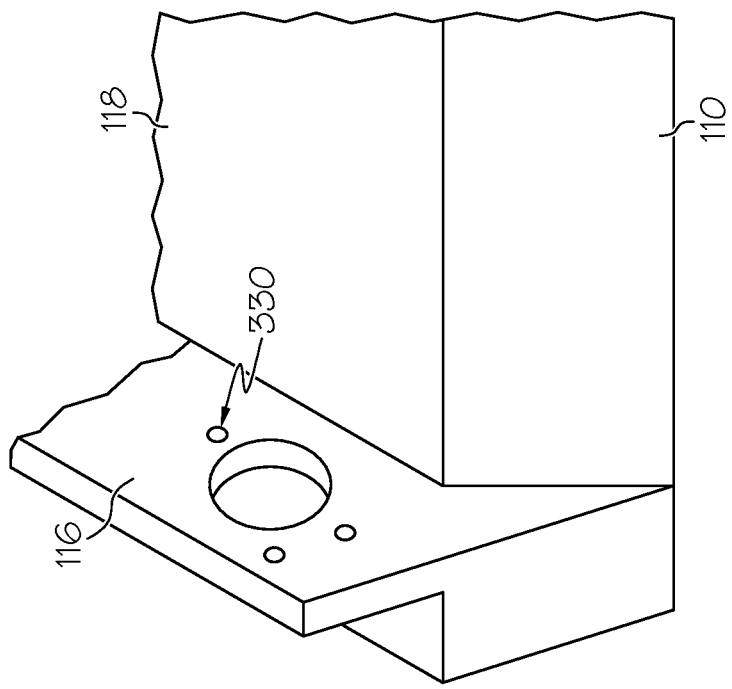
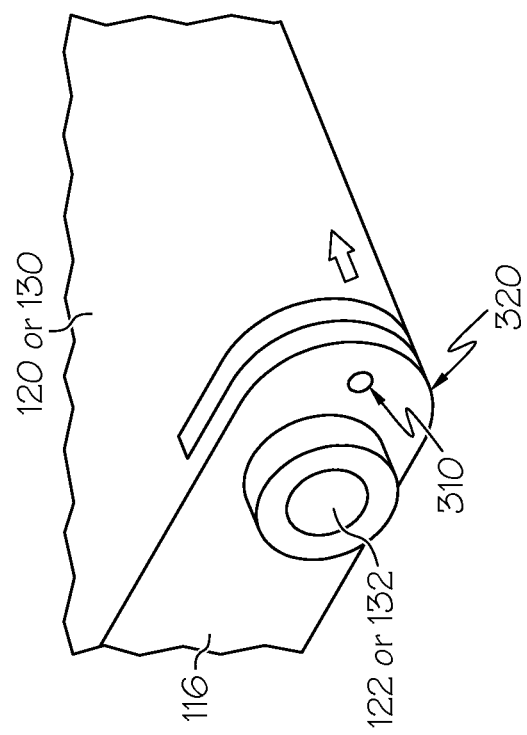
FIG. 3B
FIG. 3A

KEYBOARD FOR SLATE PERSONAL COMPUTERS

BACKGROUND OF THE INVENTION

The present invention relates generally to keyboards and, more specifically, to foldable keyboards which can be used in slate personal computers (PCs).

In recent years, portable computers have evolved from transportable suitcase style computers, to laptops or notebooks, and then to slate PCs (also referred to as "tablets" or "pure tablets"). Portable laptops or notebook computers generally have full-sized or nearly full-sized keyboards that allow data entry. However, such computers do not readily allow data entry when the user is standing, in motion, or away from a table.

Slate PCs may allow a user enter data while standing, in motion, or away from a table by using a stylus or touch screen. Stylus or touch screen data entry is much slower than data entry by a full sized keyboard, particularly if the user is experienced with a keyboard. In addition, while sitting at a desk and using a slate PC to process data, users may find it convenient to have the display screen set upright. In addition, users may change the standing angle of the slate PC from time to time subject to the change of the sitting posture.

Therefore, it can be seen that there is a need for a slate PC to have a keyboard, a latchkey mechanism, and back support for rapid data entry.

SUMMARY

In one aspect, a computer system comprises an upper housing, a processor within the upper housing; a display screen attached to the upper housing; a lower housing comprising a keyboard, the lower housing being mounted to and pivotable with respect to the upper housing; and a keyboard cover being mounted on the upper housing surface opposite of the display screen wherein the keyboard cover moves pivotably relative to the display screen.

In another aspect, an electronic computing device comprises an upper housing having a front face and an opposing rear face; a processor within the upper housing; a screen attached to the upper housing at the front face in which the screen is coupled to be operable by the processor to display data to a user of the device; and a lower housing having a hinge and an input device, wherein the lower housing is adapted to be received and nested in a recess on the rear face of the upper housing In a further aspect, a mobile computing device comprising an upper housing having a screen carried on a first side; a lower housing having a set of input keys disposed on an operational surface, the lower housing being operably coupled to the upper housing for movement between a slate mode and a desktop mode, wherein, in the slate mode, the lower housing folds into a surface of the upper housing opposite of the first side with the set of input keys facing away from the first side of the upper housing.

These and other features, aspects and advantages of the present invention will become better understood with reference to the following drawings, description and claims.

BRIEF DESCRIPTION OF THE DRAWINGS

FIG. 2A is a cross sectional view of a keyboard, keyboard cover, and an upper housing of the slate PC of FIG. 1 in a laptop mode;

FIG. 2B is a cross sectional view of a keyboard, keyboard cover, and an upper housing of the slate PC of FIG. 1 in a desktop mode;

FIG. 3A is a detailed view of a connection between keyboard cover or a keyboard and an upper housing of the slate PC of FIG. 1 according to an exemplary embodiment; and FIG. 3B is a detailed view of a part of an upper housing of the slate PC of FIG. 1 according to an exemplary embodiment.

DETAILED DESCRIPTION OF EMBODIMENTS

Figure 1:
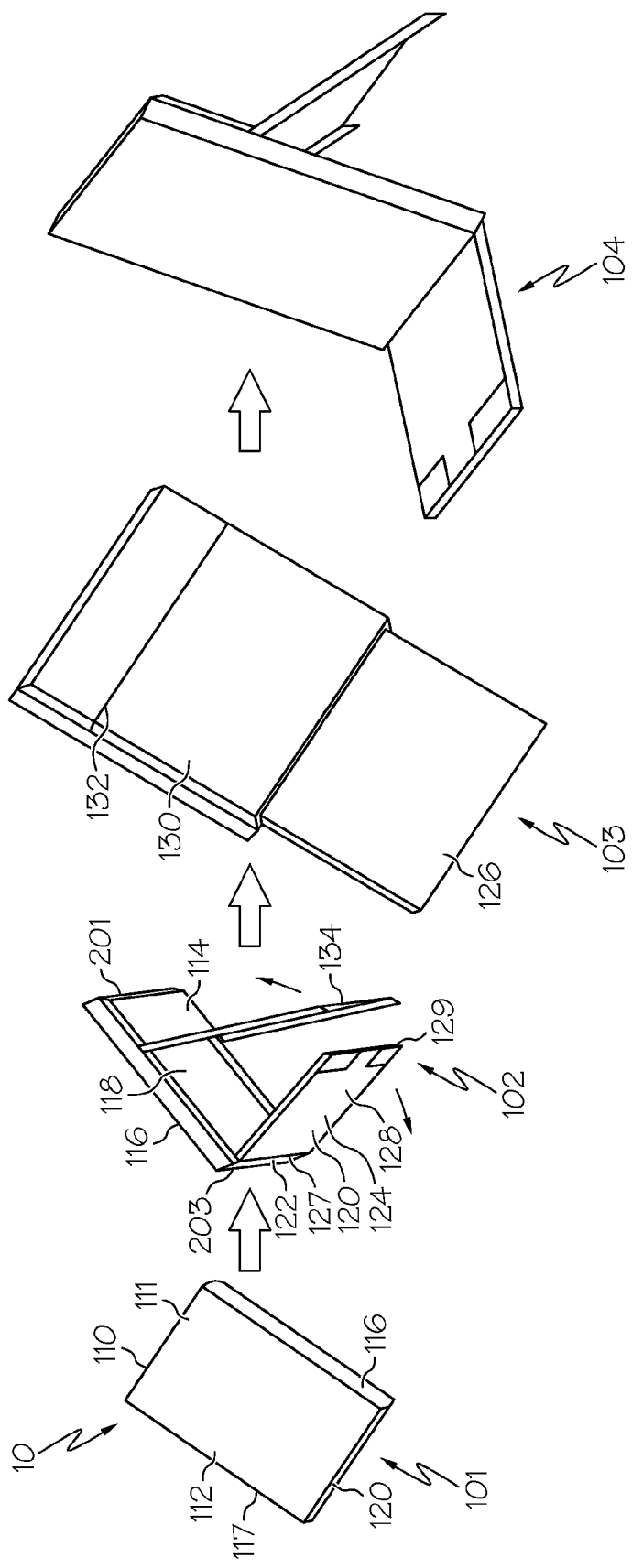
FIG. 1 is a flow diagram showing the changes of modes of operation for converting a slate PC of an exemplary embodiment from a slate mode to a laptop mode to a desktop mode.

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments comprise a slate PC with a foldable keyboard. More specifically, exemplary embodiments of a slate PC may be configured for use in a slate mode, a laptop mode, and a desktop mode. According to exemplary embodiments, the foldable keyboard may be folded into a slate body with a cover covering the keyboard. In the laptop mode, the keyboard may be unfolded and the keyboard may be substantially parallel to and adjacent to a main body of the slate PC. The keyboard and keyboard cover may have a latch key assembly for locking the keyboard and the main body of the slate PC at a predetermined angle relative to each other. The keyboard cover may lock the keyboard to keep the keyboard at a certain angle with the main body. In the desktop mode, the keyboard cover may work as an easel to support the slate body at its back and disperse "touch force" exerted by users when they use touch the screen.

Referring to FIG. 1, a slate PC 10 may comprise an upper housing 110 and a lower housing 120, such as a keyboard case, for example, wherein the upper housing 110 and the keyboard case 120 may be connected via a hinge 122.

The slate PC 10 may include a processor (not shown) within the upper housing 110. The upper housing 110 may include a front face 111 and an opposite rear face 114 with two sides 117 and 116. The upper housing 110 may include a top edge 201 and a bottom edge 203. A liquid crystal display (LCD) screen 112, which may be a touch screen, for example, may be disposed on the front face 111 of the upper housing 110. The screen 112 may be coupled to be operable by the processor to display data to a user of the slate PC 10. The upper housing 110 may provide a complementary shaped recess 118 in the rear face 114 for receiving and nesting the keyboard case 120.

The keyboard case 120 may include an inwardly facing surface 126 and an operational surface 124. An input device, such as a keyboard 128 may be installed on the operational surface 124. The keyboard case 120 may include a hinged end 127 and an opposite disposed end 129. The keyboard case 120 may have a hinge 122 at the hinged end 127. The keyboard case 120 may pivot about the hinge 122 substantially 120 degrees, for example, with respect to the upper housing 110. The slate PC may include a keyboard cover 130 to cover the keyboard case 120. The keyboard cover 130 may include a first edge 134 and a hinge 132. The hinge 132 may be mounted transversely across rear face 114 of the upper housing 110. The keyboard cover 130 may be adapted to move pivotally on the hinge 132. The recess 118 in the rear face 114 may be designed for receiving and nesting the keyboard cover 130.

In operation of an exemplary embodiment, FIG. 1 shows a flow diagram of modes of operation for converting a slate PC from a slate mode to a laptop mode and to a desktop mode. The slate PC may have a plurality of modes of changing sequences, such as from a desktop mode to a laptop mode, from a desktop mode to a slate mode, from a laptop mode to a slate mode, for example.

When the slate PC 10 is in the a slate mode, as shown in mode of operation 101 of FIG. 1, the keyboard case 120 may be folded into the rear face 114 of the upper housing 110 opposite of the front face 111, while the inwardly facing surface 126 of the keyboard case 120 may be disposed adjacent to and substantially parallel with the rear face 114 of the upper housing 110. The keyboard cover 130 may cover the keyboard case 120. Also users may use the slate PC 10 in slate mode of operation 101 while standing, in motion or away from a table, for example, by using the touch screen 112. In the slate mode of operation 101, the keyboard 128 may face away from the front face 111 of the upper housing 110.

Users may use the slate PC 10 in a transition mode of operation 102 while users are converting the slate PC 10 from slate mode 101 to laptop mode 103. In the transition mode of operation 102, the first edge 134 of the keyboard cover 130 may be moved pivotally on the hinge 132. The keyboard case 120 may be moved pivotally on the hinge 122.

Users may use the slate PC 10 in laptop mode of operation 103 while sitting in a car, a train, a subway, or an airplane, for example. In the laptop mode of operation 103, the keyboard case 120 may be unfolded further to the laptop mode. In the laptop mode, the keyboard case 120 may be substantially parallel and adjacent to the upper housing 110 and the keyboard cover 130. The keyboard cover 130 may be closed against the rear face 114 of the upper housing 110.

In a desktop mode of operation 104, users may sit in front of a desk with the slate PC 10 on the desk, for example. The keyboard case 120 may be unfolded further to the desktop mode. In the desktop mode 104, the keyboard cover 130 may be unfolded and may be moved pivotally on the hinge 132. The keyboard cover 130 may be used as an easel to support the upper housing 110 in the desktop mode. The keyboard cover 130 may disperse "touch force" exerted by users when they use the touch screen 112.

FIGS. 2A and 2B illustrate a cross sectional view of a keyboard 120, a keyboard cover 130, and an upper housing 110 of a slate PC 10 in a laptop mode and in a desktop mode, respectively. In an exemplary embodiment, the keyboard cover 130 may have a latch 136. The keyboard case 120 may have a zigzag stopper 123. The latch 136 and the zigzag stopper 123 may form a latch key assembly which helps the keyboard case 120 maintain certain angles with the upper housing 110.

The keyboard case 120 may have an additional mechanism to help the keyboard case 120 and the upper housing 110 maintain certain configurations. As shown in FIGS. 3A and 3B, the keyboard case 120 may have a biasing member 320 as an additional mechanism, such as a plastic spring, for example, for generating a biasing force to damp the pivoting force of the keyboard case 120 to a nearly closed position. This pivoting force may be due to gravity acting on the keyboard case 120. The keyboard cover 130 may also have a biasing member 320, such as a plastic spring, for example, for generating a biasing force to damp the pivoting force of the keyboard cover 130 to a nearly closed position. This pivoting force may be due to gravity acting on the keyboard cover 130.

The keyboard case 120 may further have a bump 310 which is configured for being received in a recess 330 on the side 116 of the upper housing 110. The keyboard cover 130 may also have a bump 310 have a single additional component which is configured for being received in the recess 330. In an exemplary embodiment, the upper housing 110 may have a plurality of recesses 330. The bump 310 on the keyboard case 120 and the recess 330 may form an angle stopper mechanism to help the keyboard case 120 to maintain a position relative to the upper housing 110. The bump 310 on the keyboard cover 130 and the recess 330 may form an angle stopper mechanism to help the keyboard cover 130 to maintain a position relative to the upper housing 110.

It should be understood, of course, that the foregoing relate to exemplary embodiments of the invention and that modifications may be made without departing from the spirit and scope of the invention as set forth in the following claims.

We claim:

1. A computer system comprising:
   an upper housing;
   a processor within the upper housing;
   a display screen attached to the upper housing;
   a lower housing comprising a keyboard, the lower housing being mounted to and pivotable with respect to the upper housing and further comprising a zigzag stopper;
   a keyboard cover being mounted on an upper housing surface opposite of the display screen wherein the keyboard cover moves pivotably relative to the display screen, the keyboard cover comprising a latch; and
   wherein the zigzag stopper and the latch form a latch key assembly wherein the keyboard cover locks the keyboard so as to maintain the keyboard at an angle with the upper housing when the computer system is in a desktop mode.

2. The computer system of claim 1, wherein the upper housing surface opposite of the display screen has a recess for receiving and nesting the lower housing when the computer system is in a slate mode.

3. The computer system of claim 1, wherein the keyboard cover has a hinge structure.

4. The computer system of claim 3, wherein the hinge structure is mounted transversely across the upper housing surface opposite of the display screen.

5. The computer system of claim 3, wherein the keyboard cover is adapted to move pivotally on the hinge.

6. The computer system of claim 1, wherein the keyboard cover further comprises a biasing element for generating a biasing force to damp pivoting force due to gravity.

7. The computer system of claim 1, wherein the upper housing surface opposite of the display screen has a recess for receiving and nesting the keyboard cover.

8. The computer system of claim 1, wherein the keyboard cover is adapted to act as an easel to support the upper housing when the computer system is in the desktop mode.

9. The computer system of claim 1, wherein the lower housing further comprises a hinge whereby the lower housing is mounted to an edge of the upper housing.

10. An electronic computing device comprising:
    an upper housing having a front face and an opposing rear face;
    a processor within the upper housing;
    a screen attached to the upper housing at the front face, the screen is coupled to be operable by the processor to display data to a user of the device; and a lower housing having a hinge and a keyboard, the lower housing being mounted to and pivotable with respect to the upper housing, wherein the lower housing is adapted to be received and nested in a recess on the rear face of the upper housing when the electronic computing device is in a slate mode, the lower housing further having a bump configured for being received in a recess in a side of the upper housing to form an angle stopper mechanism wherein the keyboard is urged to maintain a certain angle with the upper housing when the electronic computing device is in a desktop mode.

11. The electronic computing apparatus of claim 10, wherein the lower housing pivots over substantially 120 degrees with respect to the upper housing.

12. The electronic computing apparatus of claim 10, wherein the screen is a touch screen.

13. The electronic computing apparatus of claim 10, wherein the lower housing has a biasing element for generating a biasing force to damp pivoting force due to gravity.

14. A mobile computing device comprising:
   an upper housing having a screen carried on a first side;
   a lower housing having a set of input keys disposed on an operational surface, the lower housing being operably coupled to the upper housing for movement between a slate mode and a desktop mode, wherein, in the slate mode, the lower housing folds into a surface of the upper housing opposite of the first side with the set of input keys facing away from the first side of the upper housing, the lower housing further having a bump configured for being received in a recess in a side of the upper housing to form an angle stopper mechanism wherein the lower housing in the desktop mode is urged to maintain a certain angle with the upper housing.

15. The mobile computing device of claim 14, wherein in the desktop mode, the lower housing is unfolded with the set of input keys facing upward.

16. The mobile computing device of claim 15, wherein in the desktop mode, the lower housing forms an angle with the upper housing.

17. The mobile computing device of claim 14, further comprising a laptop mode wherein, in the laptop mode, the lower housing is unfolded and is substantially parallel and adjacent to the upper housing.

18. The mobile computing device of claim 14, further comprising a keyboard cover being mounted on the upper housing surface opposite of the first side.

\* \* \* \* \*